(12) United States Patent
French

(10) Patent No.: US 7,849,263 B1
(45) Date of Patent: Dec. 7, 2010

(54) TECHNIQUES FOR CONTROLLING STORAGE CAPACITY OF A DATA STORAGE SYSTEM

(75) Inventor: F. William French, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

(21) Appl. No.: 11/963,929

(22) Filed: Dec. 24, 2007

(51) Int. Cl.
*G06F 12/00* (2006.01)

(52) U.S. Cl. .................. 711/114; 711/117; 711/170; 711/E12.006

(58) Field of Classification Search .................. None
See application file for complete search history.

(56) References Cited

U.S. PATENT DOCUMENTS

| | | | |
|---|---|---|---|
| 7,203,135 B2 | 4/2007 | Kano et al. | |
| 7,225,211 B1 * | 5/2007 | Colgrove et al. | 1/1 |
| 7,271,999 B2 | 9/2007 | Rabinovitz | |
| 7,307,832 B1 | 12/2007 | Lewis | |
| 7,319,586 B2 | 1/2008 | Hall et al. | |
| 2005/0223171 A1 * | 10/2005 | Kanai | 711/114 |
| 2007/0106843 A1 * | 5/2007 | Mori et al. | 711/114 |

* cited by examiner

*Primary Examiner*—Shawn X Gu
(74) *Attorney, Agent, or Firm*—BainwoodHuang

(57) ABSTRACT

A data storage system has a first set of storage devices, a second set of storage devices, and a controller. The controller is arranged to (i) activate a first set of storage devices and deactivate a second set of storage devices prior to an amount of storage capacity currently used in the data storage system reaching a predefined storage capacity threshold of the data storage system. The controller is further arranged to (i) monitor the amount of storage capacity currently used in the data storage system in view of the predefined storage capacity threshold, and (ii) maintain activation of the first set of storage devices and automatically activate the second set of storage devices in response to the amount of storage capacity currently used in the data storage system reaching the predefined storage capacity threshold.

20 Claims, 4 Drawing Sheets

TECHNIQUES FOR CONTROLLING STORAGE CAPACITY OF A DATA STORAGE SYSTEM

BACKGROUND

A conventional data storage system typically includes an assemblage of disk drives and storage directors (or storage processors). During operation, the storage processors store data onto and retrieve data from the disk drives on behalf of one or more external host devices.

In some data storage systems, disk array enclosures (DAEs) house small groups of disk drives (e.g., 15 disk drives). Each DAE typically has its own communications and power cable harnesses which enable that DAE to individually connect to various other parts of the data storage system such as the storage directors and the power supplies.

One conventional large-scale data storage system divides storage directors and DAEs into separate electronic bays (or cabinets). In particular, the storage directors (along with semiconductor memory modules and network interface modules) reside in a dedicated centrally-located control bay with its own power supply and fan resources, and the DAEs reside in similarly-sized disk drive bays which flank the control bay and which have their own power supply and fan resources.

During operation of the large-scale data storage system, all of the disk drives in all of the DAEs in the storage bays are turned on, powered up and receive cooling from respective sets of fans. During periods of inactivity, some of the disk drives may spin down but all of the disk drives in the system nevertheless remain activated, i.e., all of the power supplies stay turned on so that all of the disk drives continuously are supplied with power and receive cooling.

It should be understood that the above-described large-scale data storage system is capable of accommodating the needs of a company having fast growing data storage needs. In particular, although only a few of the DAEs may be involved in storing actual data when the storage system is initially put into operation, all of the DAEs remain activated (i.e., powered on and cooled) and may be involved in storing actual data in a relatively short period of time (e.g., one or two years).

SUMMARY

Unfortunately, there are deficiencies to the above-described conventional large-scale data storage system which powers and cools all of the disk drives in all of the DAEs in all of the storage bays even though only a few DAEs may be involved in storing actual data. For example, the DAEs which do not store actual data unnecessarily consume power as well as require maintenance and support (e.g., the fans may continue to run in the DAEs that do not store actual data) since all of the disk drives are supplied with electricity and receive cooling continuously. Although it may make sense logistically to provision, stage, and configure the conventional large-scale data storage system with initially unused storage capacity if data storage needs are expected to quickly grow, there is no need to waste power and cooling resources on the DAEs that are not initially involved in data storage.

In contrast to the above-described large-scale conventional data storage system which powers and cools all of the disk drives in all of the storage bays even though only a few DAEs may be initially involved in storing actual data, improved data storage techniques control the storage capacity of a data storage system having multiple storage devices by initially deactivating at least some of the storage devices to lower power consumption and waste less resources, i.e., to provide "greener" operation. Such techniques nevertheless allow the deactivated storage devices to be activated as additional storage capacity is needed. For example, when a predefined storage capacity threshold is reached in the system, the system can supply power to one or more DAEs containing disk drives to increase the available storage capacity of the system.

One embodiment is directed to a data storage system having a first set of storage devices, a second set of storage devices, and a controller. The controller is arranged to (i) activate a first set of storage devices and deactivate a second set of storage devices prior to an amount of storage capacity currently used in the data storage system reaching a predefined storage capacity threshold of the data storage system. The controller is further arranged to (i) monitor the amount of storage capacity currently used in the data storage system in view of the predefined storage capacity threshold, and (ii) maintain activation of the first set of storage devices and automatically activate the second set of storage devices in response to the amount of storage capacity currently used in the data storage system reaching the predefined storage capacity threshold. Such an embodiment enables the data storage system to more efficiently consume certain resources (e.g., power and cooling) than conventional data storage systems in which all of the disk drives and fans are supplied with power and continue to use electricity.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved data storage techniques control the storage capacity of a data storage system having multiple storage devices by deactivating at least some of the storage devices thus consuming less power. Such techniques nevertheless allow the deactivated storage devices to be activated as additional storage capacity is needed. For example, when a predefined storage capacity threshold is reached in the system, the system can provide power to one or more DAEs containing disk drives to increase the available storage capacity of the system.

Figure 1:
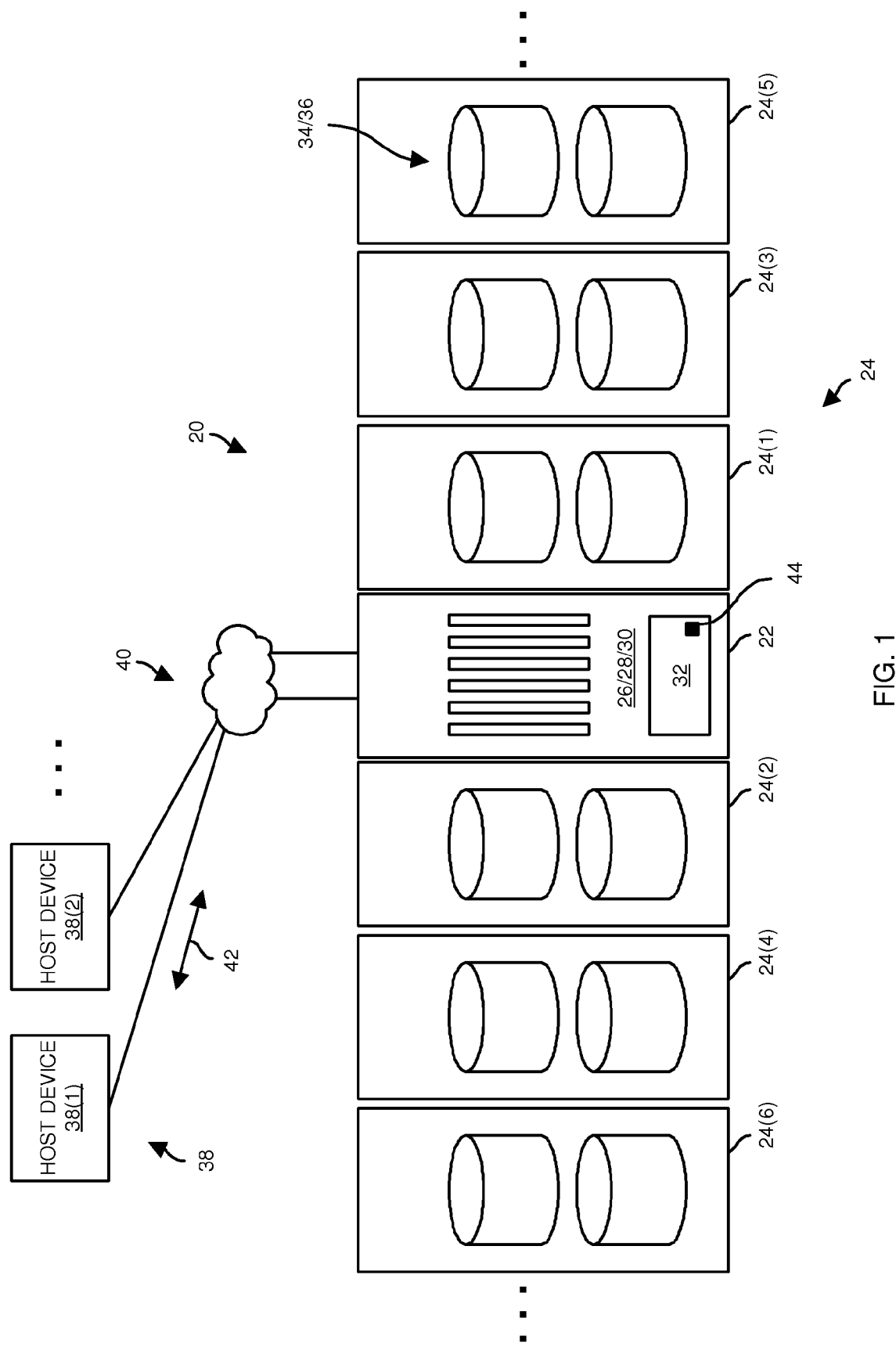
FIG. 1 is a block diagram of a data storage system which controls storage capacity by initially deactivating at least some storage devices to consume less power.

FIG. 1 shows a data storage system 20 which controls storage capacity by initially deactivating at least some storage devices (e.g., disk drives). The data storage system 20 includes a control bay 22 (i.e., a specialized electronic cabinet), and multiple storage bays 24(1), 24(2), 24(3), 24(4), 24(5), 24(6), . . . (collectively, storage bays 24). The control bay 22 includes storage directors 26, memory modules 28, I/O interfaces 30, and a controller 32, among other things (e.g., local power supplies, a local cooling subsystem, a service processor or user console, etc.). Each storage bay 24 connects to the control bay 22 and includes multiple storage array enclosures 34 (illustrated by the disk drive icons 34). Each storage array enclosure 34 has a respective local power supply 64 and cooling subsystem 62, and is capable of being individually activated and deactivated (e.g., turned on or off).

By way of example, the control bay 22 is centrally located, and the storage bays 24 extend from both the right and left sides of the control bay 22. Additionally, although only two disk drive icons are shown in each storage bay 24 for simplicity, it should be understood that each storage bay 24 is capable of including many storage array enclosures 34 (e.g., disk array enclosures or DAEs), each of which houses multiple storage devices 36 (e.g., 15 disk drives). Preferably, the storage array enclosures are tightly stacked into rows and columns in a high density manner within each storage bay 22.

During operation, the storage directors 26 (e.g., front-end directors, back-end directors, storage processors, array controllers, blades, etc.) are arranged to perform data storage operations (e.g., read operations, write operations, read-modify-write operations, etc.) on behalf of a set of external host devices 38(1), 38(2), . . . (collectively, host devices 38). The memory modules 28 form the main memory of the data storage system 20 (e.g., primary memory for storing operating system code and structures, cache memory for caching host data, etc.). The I/O interfaces 30 are arranged to provide connectivity to the host devices 38 (e.g., SAN connectivity, LAN connectivity, etc.) through a communications medium (or fabric) 40. Accordingly, the control bay 22 reliably loads host data into and reads host data from storage devices 36 of the storage bays 24 (e.g., see the arrow 42 which illustrates the exchange of host data between the host devices 38 and the data storage system 20).

While the data storage system 20 is in operation, the controller 32 is arranged to control activation and deactivation of the storage devices 36 for efficient utilization of cooling and power resources. Along these lines, the controller 22 monitors the size of the actual data stored by the data storage system 20 in view of the currently available storage capacity provided by the storage devices 36. When the data storage system 20 reaches a predefined storage capacity threshold 44, the controller 32 activates (or turns on) at least some of the deactivated storage devices 36 to increase the available storage capacity. Further details will now be provided with reference to FIG. 2.

Figure 2:
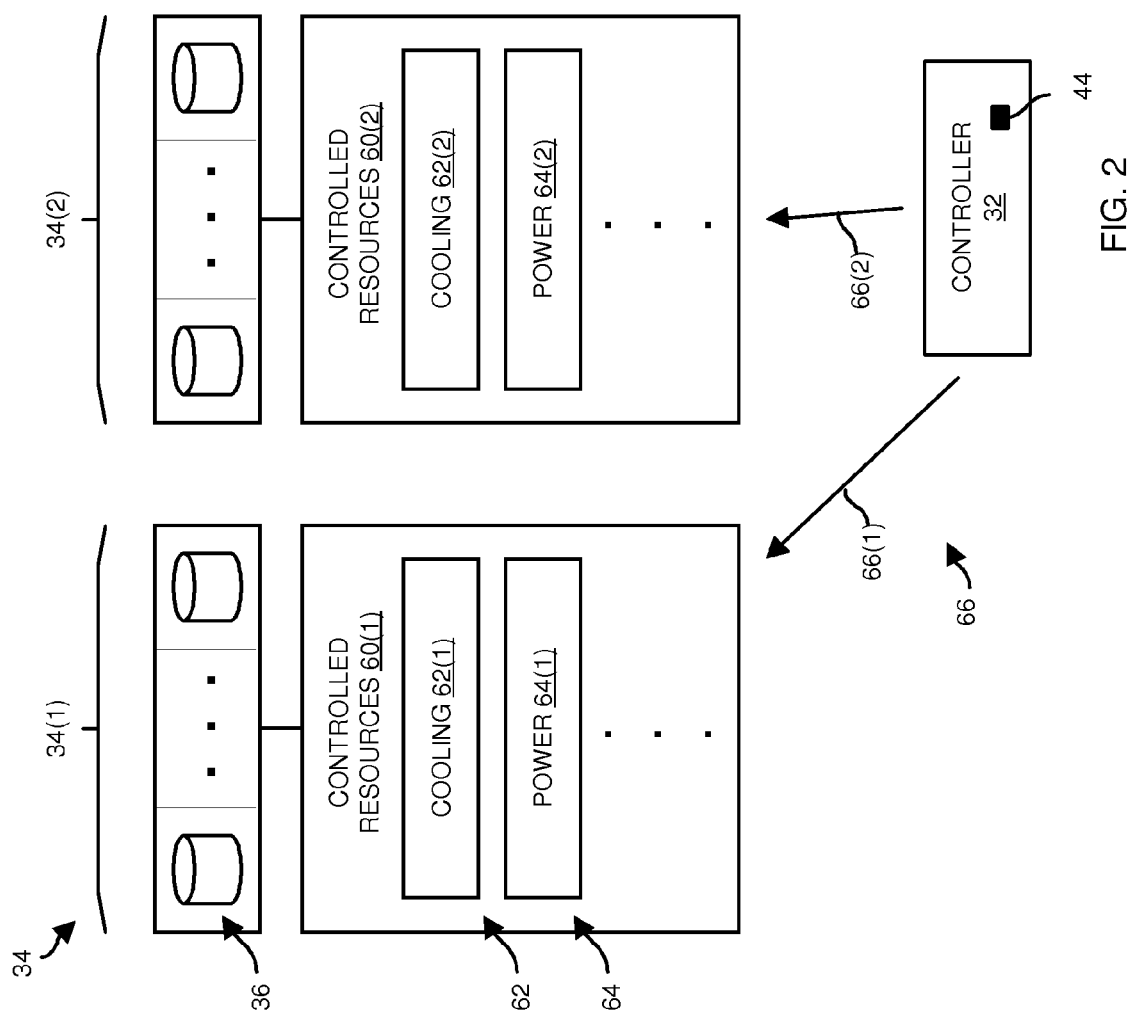
FIG. 2 is a block diagram which illustrates operation of the data storage system of FIG. 1.

FIG. 2 shows how the controller 32 is able to control activation of the storage devices 36. Each storage device enclosure 34 includes a group of storage devices 36 (illustrated as disk drives), and resources 60 which support that group of storage devices 36. The resources 60 of each storage device enclosure 34 include, among other things, cooling subsystems 62, and power resources 64. For example, the controlled resources 60(1) of the storage device enclosure 34(1) include a cooling subsystem 62(1) (e.g., one or more fans or blowers) and a power supply resource 64(1) (e.g., one or more power supplies/converters). Similarly, the controlled resources 60(2) of the storage device enclosure 34(2) include a cooling subsystem 62(2) and a power supply resource 64(2), and so on.

During operation, the controller 32 determines which storage device enclosures 34 to activate and deactivate based on monitoring the current amount of actual storage consumed in the data storage system in view of the predefined storage capacity threshold 44. The controller 32 is able to activate or deactivate each storage device enclosure 34 based on the value of a respective control signal 66 to that storage device enclosure 34. For example, the particular value of a control signal 66(1) from the controller 32 determines whether the storage device enclosure 34(1) is activated. Similarly, the particular value of a control signal 66(2) from the controller 32 determines whether the storage device enclosure 34(2) is activated. Along these lines, to increase the storage capacity which is available on the data storage system 20, the controller 32 simply activates additional storage device enclosures 34 over time.

At this point, it should be understood that there are a variety of ways to selectively activate or deactivate a storage device enclosure 34. Particular ways of activating and deactivating the storage device enclosures are better suited than others depending on how access to power provided within each storage bay 24.

In some arrangements, bulk power supplies reside within each storage bay 34 (and perhaps bulk battery backup for each storage bay 34). In these arrangements, the power resource 64 of each storage device enclosure 34 includes a switch (or a relay) which turns on delivery of operating power to the cooling subsystem 62 and the group of storage devices 36 of that enclosure 34 in response to receipt of a control signal 66 from the controller 32. In particular, if the switch does not receive a control signal 66 from the controller 32, the switch leaves the cooling subsystem 62 and the storage devices 36 disconnected from the bulk power supplies. As a result, the enclosure 34 is deactivated and remains in a powered off state.

However, if the switch receives a control signal 66 from the controller 32, the switch connects the cooling subsystem 62 and the storage devices 36 to the bulk power supplies. Here, the enclosure 34 becomes activated and remains in a powered on state. In response, the storage devices 36 provide additional available storage capacity to the data storage system 20, and the cooling subsystem 62 adequately cools the newly activated storage devices 36.

In other arrangements, each storage device enclosure 34 has a respective power source and there are no bulk power supplies within each storage bay 34. In these other arrangements, the power resource 64 of each storage device enclosure 34 includes a local power supply (or converter) which is dedicated to that enclosure 34, and which is turned on in response to receipt of a respective control signal 66 from the controller 32. In particular, if the local power supply does not receive the control signal 66, the local power supply remains turned off. As a result, the enclosure 34 is deactivated and remains in a powered off state.

However, if the local power supply receives a control signal 66 from the controller 32, the local power supply turns on and provides operating power to the cooling subsystem 62 and the storage devices 36. Accordingly, the enclosure 34 becomes activated and remains in a powered on state thus providing additional available storage capacity to the data storage system 20.

It should be understood that control of activation and deactivation of the storage devices 36 was described above as occurring on an enclosure-by-enclosure basis by way of example only. Other granularity levels of device activation/deactivation is suitable for use as well. For example, in other arrangements, each control signal 66 is arranged to activate an entire bay 24 of storage devices 36 (e.g., by turning bulk power supplies on to maintain the entire bay 24 in a powered on state). In yet other arrangements, each control signal 66 is arranged to activate a particular individual storage device 36 within an enclosure 34. Further details will now be provided with reference to FIG. 3.

Figure 3:
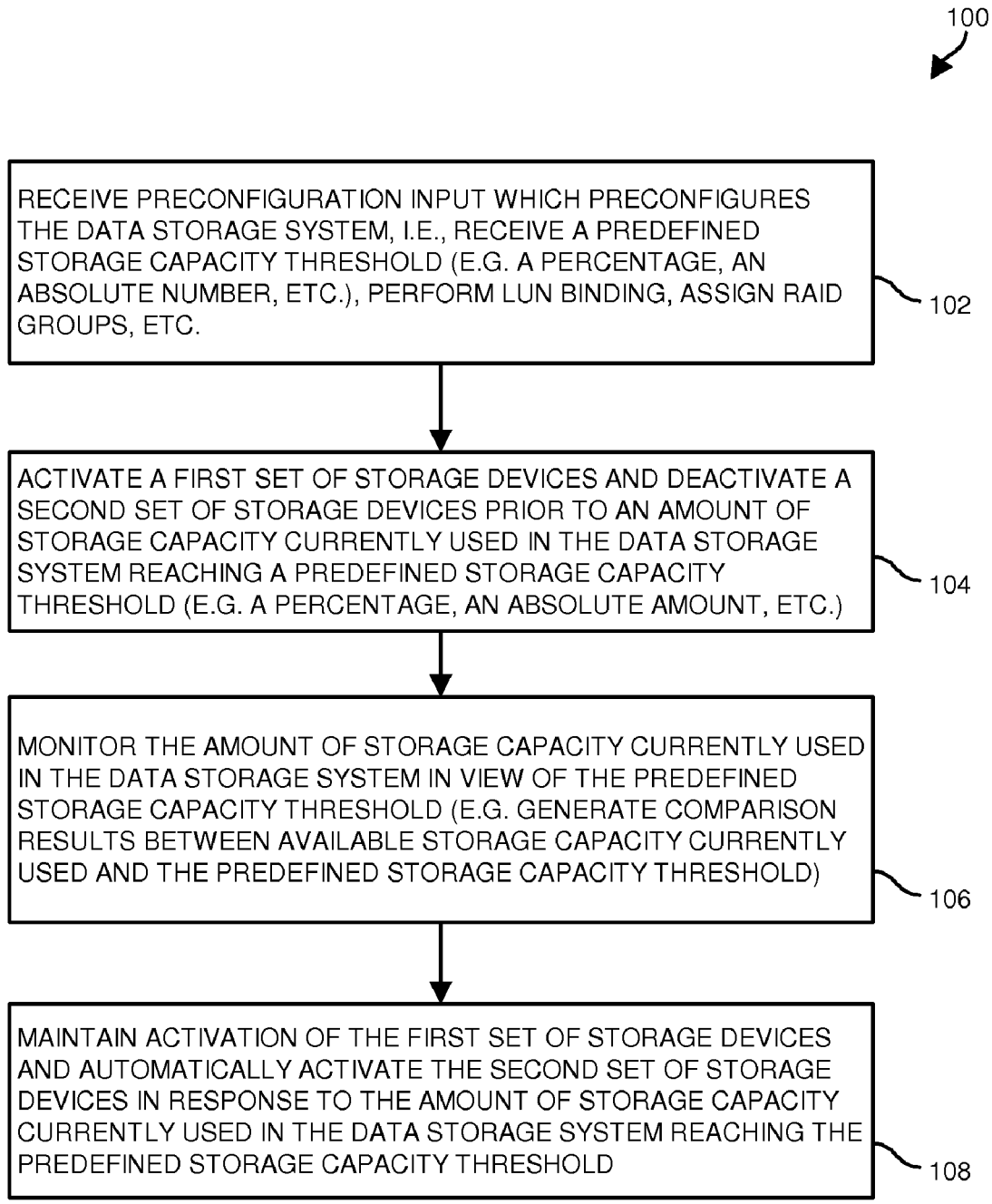
FIG. 3 is a flowchart of a procedure which is performed by the data storage system of FIG. 1.

FIG. 3 is a flowchart of a procedure 100 which is performed by the controller 32 of the data storage system 20 when controlling storage capacity in a power conserving manner. In step 102, the controller 32 receives pre-configuration input from a user in order to pre-configure the data storage system 20. In particular, the user receives a predefined storage capacity threshold 44. In some arrangements, the predefined storage capacity threshold 44 is a percentage of utilized storage capacity (e.g., 80%, 90%, etc.) or an absolute number/amount which is capable of being updated over time (e.g., 500 Gigabytes, 1 Terabyte, 2 Terabytes, etc.). In other arrangements, the predefined storage capacity threshold 44 is a percentage of free/available storage capacity or an absolute number/amount of free storage space.

The controller 32 is able to receive other pre-configuration settings at this time as well such as input to bind the storage devices 36 to logical unit numbers (LUNs), and forming the storage devices 36 into different RAID (redundant arrays of inexpensive disks) groups. Other parameters can be set at this time as well such as which storage array enclosures 34 (e.g., which LUNs, which RAID groups, etc.) will be activated as storage capacity is consumed over time.

In step 104, the controller 32 activates a first set of storage devices (e.g., the disk drives in one or more DAEs) and deactivates a second set of storage devices (e.g., the disk drives in one or more other DAEs) prior to reaching the predefined storage capacity threshold 44 of the data storage system. In particular, once the all of the components of the data storage system 20 have been assembled and tested at an installation site, some of the DAEs which, at least initially, are not involved in storing actual data are turned off to conserve resources (e.g., power and cooling). This situation exists when the data storage system 20 begins operation.

In step 106, the controller 32 monitors the amount of storage capacity currently used in the data storage system 20 in view of the predefined storage capacity threshold 44. Along these lines, the controller 32 continuously updates the amount of storage capacity currently used in the data storage system, and compare the amount of storage capacity currently used in the data storage system to the predefined storage capacity threshold 44 (e.g., generates periodic comparison results) to determine whether the predefined storage capacity threshold 44 has been reached.

In step 108, the controller 32 maintains activation of the first set of storage devices and automatically activates the second set of storage devices 36 in response to the amount of storage capacity currently used in the data storage system reaching the predefined storage capacity threshold 44. To activate second set of storage devices 36, the controller 32 provides a control signal 66, e.g., to activate a storage array enclosure 34 containing multiple storage devices 36. As a result of activation of the second set of storage devices 36, additional storage capacity is now available to accommodate further data storage.

It should be understood that steps 104 through 108 can be repeated to incrementally increase the available storage capacity over time. For illustration purposes and with reference to FIG. 1, all of the storage array enclosures 34 within the storage bays 24(1) and 24(2) are activated (shown by the non-darkened disk drive icons). In contrast, all of the storage array enclosures 34 within the storage bays 24(4), 24(5) and 24(6) are deactivated (shown by the darkened disk drive icons). Furthermore, the storage bay 24(3) includes both activated and deactivated storage array enclosures 34 having storage devices 36 (shown by the darkened disk drive icons and non-darkened disk drive icons). Since not all of the storage array enclosures 34 are activated, less power is consumed thus reducing operation costs and wear and tear on the system 20.

It should be understood that this situation is well suited for a variety of large-scale data storage arrangements. In particular, the data storage system 20 is able to accommodate tiered storage applications. For example, suppose that the data storage system 20 include a high performance tier of disk drive storage having high-speed disk drives to accommodate fast response time data storage operations (e.g., disk drives in storage bay 24(2)). Additionally, the data storage system 20 may further include a mid-level performance tier of disk drive storage having moderate-speed disk drives which are slower than the high-speed disk drives to accommodate database storage operations (e.g., disk drives in storage bay 24(1)).

Furthermore, the data storage system 20 may also include a low-level performance tier of disk drive storage to accommodate archive storage operations, the low-level performance tier of disk drive storage including the first and second sets of disk drives, disk drives of the first and second sets of disk drives being are slower than the moderate-speed disk drives (e.g., disk drives in storage bays 24(3) through 24(6)). Here, as the archival needs of the data storage system 20 increases, the controller 32 automatically activates storage array enclosures 34 that were previously deactivated to save power. Such automatic activation is preferably immediate and non-burdensome thus accommodating dynamically changing storage requirements. Further details will now be provided with reference to FIG. 4.

Figure 4:
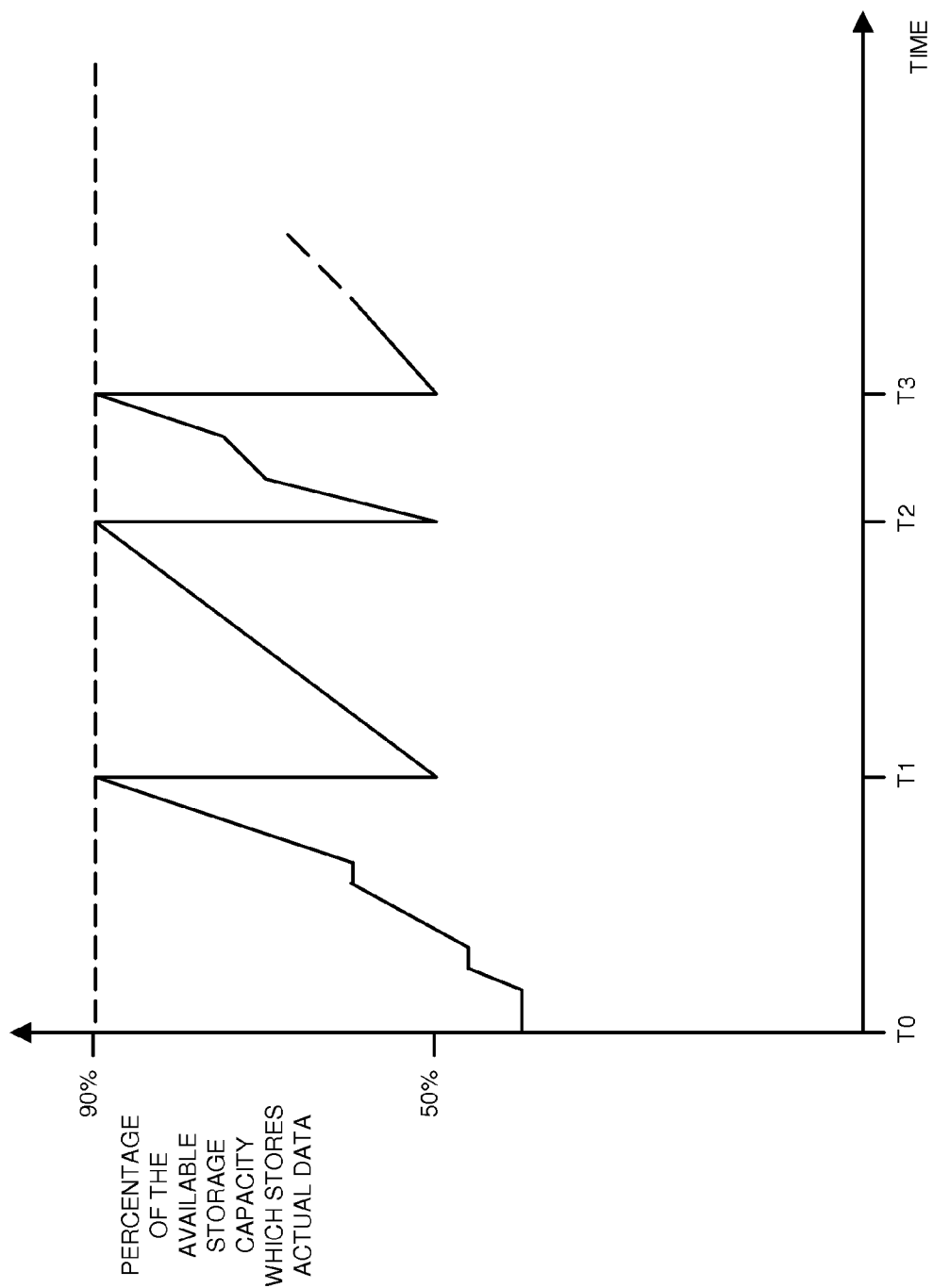
FIG. 4 is a graph showing an example of the operational capabilities of the data storage system of FIG. 1.

FIG. 4 is a graph 200 showing an example of the operational capabilities of the data storage system 20 as the actual storage capacity within the data storage system changes over time. The X-axis is time (e.g., days, weeks, months, etc.). The Y-axis shows the percentage of the available storage capacity provided by the storage devices 36 (or a particular tier of storage devices 36 as in the three tier example provided earlier) which stores actual data.

By way of example only, the predefined storage capacity threshold 44 is set at 90%, i.e., the controller 32 is configured monitor and automatically increase the amount of available storage capacity when 90% of the available storage capacity of the data storage system 20 stores actual data. Nevertheless, it should be understood that other percentages or values are suitable for use as well. Moreover, the predefined storage capacity threshold 44 is capable of being a percentage or absolute value of available free space such as 10% (e.g., when 10% of the available storage capacity of the data storage system 20 remains free space).

As shown in FIG. 4, during the time period between T0 and T1, less than 90% of the available storage capacity stores actual data. However, at time T1, 90% of the available storage capacity stores actual data so the controller 32 provides a control signal 66 to activate one or more storage array enclosures 34 thus increasing the available storage capacity on the data storage system 20 and lowering the percentage of the available storage capacity of the data storage system 20 which stores actual data. For simplicity, the ratio actually used space to total available space is brought back a percentage, e.g., 50%. Alternatively, constant amounts of additional space are added which could result in varying percentages after the space is added.

The percentage of the available storage capacity of the data storage system 20 which stores actual data reaches 90% again at times T2 and T3. By way of example, times T1, T2 and T3 are shown an being uneven to illustrate the dynamic operation of the controller 32. At both times T2 and T3, the controller 32 provides respective control signals 66 to activate more storage array enclosures 34 thus increasing the available storage capacity on the data storage system 20 and lowering the percentage of the available storage capacity of the data storage system 20 which stores actual data. In this manner, the controller 32 gradually increases the available storage capacity and concurrently conserves power.

An improved data storage technique control the storage capacity of a data storage system 20 having multiple storage devices 36 by initially deactivating at least some of the storage devices 36 to lower power consumption and waste less resources, i.e., to provide "greener" operation. Such techniques nevertheless allow the deactivated storage devices 36 to be activated as additional storage capacity is needed. For example, when a predefined storage capacity threshold 44 is reached in the system 20, the system 20 can supply power to one or more storage array enclosure 34 (or bays 24) containing disk drives to increase the available storage capacity of the system 20.

While various embodiments of the invention have been particularly shown and described, it will be understood by those skilled in the art that various changes in form and details may be made therein without departing from the spirit and scope of the invention as defined by the appended claims.

What is claimed is:

1. A method of controlling storage capacity of a data storage system, the method comprising:
    activating a first set of storage devices of the data storage system and deactivating a second set of storage devices of the data storage system prior to an amount of storage capacity currently used in the data storage system reaching a predefined storage capacity threshold of the data storage system;
    monitoring the amount of storage capacity currently used in the data storage system in view of the predefined storage capacity threshold; and
    maintaining activation of the first set of storage devices of the data storage system and automatically activating the second set of storage devices of the data storage system in response to the amount of storage capacity currently used in the data storage system reaching the predefined storage capacity threshold;
    wherein the first set of storage devices includes a first set of disk drives and the second set of storage devices includes a second set of disk drives;
    wherein the data storage system includes:
        a high performance tier of disk drive storage having high-speed disk drives to accommodate fast response time data storage operations;
        a mid-level performance tier of disk drive storage having moderate-speed disk drives which are slower than the high-speed disk drives to accommodate database storage operations; and
        a low-level performance tier of disk drive storage to accommodate archive storage operations, the low-level performance tier of disk drive storage including the first and second sets of disk drives;
    wherein disk drives of the first and second sets of disk drives are slower than the moderate-speed disk drives; and
    wherein automatically activating the second set of storage devices of the data storage system in response to the amount of storage capacity currently used in the data storage system reaching the predefined storage capacity threshold includes spinning up and cooling the second set of disk drives of the low-level performance tier of disk drive storage.

2. A method as in claim 1 wherein activating the first set of storage devices of the data storage system and deactivating the second set of storage devices of the data storage system includes:
    providing operating power to the first set of storage devices and not providing operating power to the second set of storage devices.

3. A method as in claim 2 wherein activating the first set of storage devices of the data storage system and deactivating the second set of storage devices of the data storage system further includes:
    running a first cooling subsystem which is arranged to cool the first set of storage devices while the first set of storage devices is in operation, and not running a second cooling subsystem which is arranged to cool the second set of storage devices while the second set of storage devices is in operation.

4. A method as in claim 3 wherein maintaining activation of the first set of storage devices of the data storage system and automatically activating the second set of storage devices of the data storage system includes:
    maintaining operating power to the first set of storage devices and automatically providing operating power to the second set of storage devices in response to the amount of storage capacity currently used in the data storage system reaching the predefined storage capacity threshold.

5. A method as in claim 4 wherein maintaining activation of the first set of storage devices of the data storage system and automatically activating the second set of storage devices of the data storage system further includes:
    continuing to run the first cooling subsystem which is arranged to cool the first set of storage devices while the first set of storage devices is in operation, and automatically running the second cooling subsystem which is arranged to cool the second set of storage devices while the second set of storage devices is in operation in response to the amount of storage capacity currently used in the data storage system reaching the predefined storage capacity threshold.

6. A method as in claim 2 wherein the first set of disk drives resides in a first disk array enclosure; wherein the second set of disk drives resides in a second disk array enclosure; and wherein providing operating power to the first set of storage devices and not providing operating power to the second set of storage devices includes:
    maintaining the first disk array enclosure in a powered on state, and maintaining the second disk array enclosure in a powered off state.

7. A method as in claim 6, further comprising:
    prior to maintaining the second disk array enclosure in a powered off state, (i) powering up the second disk array enclosure, (ii) binding the second set of disk drives residing in the second disk array enclosure to a set of logical unit numbers, and (iii) powering down the second disk array enclosure.

8. A method as in claim 6, further comprising:
    prior to maintaining the second disk array enclosure in a powered off state, (i) powering up the second disk array enclosure, (ii) assigning the second set of disk drives residing in the second disk array enclosure to a set of redundant array of inexpensive disks (RAID) groups, and (iii) powering down the second disk array enclosure.

9. A method as in claim 2 wherein monitoring the amount of storage capacity currently used in the data storage system in view of the predefined storage capacity threshold includes:
    updating the amount of storage capacity currently used in the data storage system, and
    comparing the amount of storage capacity currently used in the data storage system to the predefined storage capacity threshold to determine whether the predefined storage capacity threshold has been reached.

10. A method as in claim 9 wherein automatically activating the second set of storage devices of the data storage system in response to the amount of storage capacity currently used in the data storage system reaching the predefined storage capacity threshold includes:

turning on a power supply to deliver operating power to (i) the second set of storage devices and (ii) a cooling subsystem arranged to cool the second set of storage devices.

11. A method as in claim 9 wherein the predefined storage capacity threshold is a percentage; and wherein comparing the amount of storage capacity currently used in the data storage system to the predefined storage capacity threshold includes:

generating a comparison result between a percentage of available storage capacity currently used to the predefined storage capacity threshold to determine whether the predefined storage capacity threshold has been reached.

12. A method as in claim 9 wherein the predefined storage capacity threshold is an absolute amount of storage; and wherein comparing the amount of storage capacity currently used in the data storage system to the predefined storage capacity threshold includes:

generating a comparison result between an actual amount of storage capacity currently used to the predefined storage capacity threshold to determine whether the predefined storage capacity threshold has been reached.

13. A method as in claim 9, further comprising:

continuing to monitor the amount of storage capacity currently used in the data storage system in view of the predefined storage capacity threshold; and maintaining activation of the first and second set of storage devices of the data storage system and automatically activating a third set of storage devices of the data storage system in response to the amount of storage capacity currently used in the data storage system again reaching the predefined storage capacity threshold.

14. A method as in claim 2 wherein the first set of storage devices includes a first set of disk drives residing in a first bay; wherein the second set of storage devices includes a second set of disk drives residing in a second bay; and wherein providing operating power to the first set of storage devices and not providing operating power to the second set of storage devices includes:

maintaining the first bay in a powered on state, and maintaining the second bay in a powered off state.

15. A data storage system, comprising:

a first set of storage devices;

a second set of storage devices; and a controller coupled to the first and second sets of storage devices, the controller being arranged to:

activate the first set of storage devices and deactivate the second set of storage devices prior to an amount of storage capacity currently used in the data storage system reaching a predefined storage capacity threshold of the data storage system, monitor the amount of storage capacity currently used in the data storage system in view of the predefined storage capacity threshold, and maintain activation of the first set of storage devices of the data storage system and automatically activate the second set of storage devices of the data storage system in response to the amount of storage capacity currently used in the data storage system reaching the predefined storage capacity threshold;

wherein the first set of storage devices includes a first set of disk drives and the second set of storage devices includes a second set of disk drives;

wherein the data storage system includes:

a high performance tier of disk drive storage having high-speed disk drives to accommodate fast response time data storage operations;

a mid-level performance tier of disk drive storage having moderate-speed disk drives which are slower than the high-speed disk drives to accommodate database storage operations; and a low-level performance tier of disk drive storage to accommodate archive storage operations, the low-level performance tier of disk drive storage including the first and second sets of disk drives;

wherein disk drives of the first and second sets of disk drives are slower than the moderate-speed disk drives; and wherein automatically activating the second set of storage devices of the data storage system in response to the amount of storage capacity currently used in the data storage system reaching the predefined storage capacity threshold includes spinning up and cooling the second set of disk drives of the low-level performance tier of disk drive storage.

16. A data storage system as in claim 15 wherein the controller, when activating the first set of storage devices and deactivating the second set of storage devices, is arranged to:

provide operating power to the first set of storage devices and not provide operating power to the second set of storage devices.

17. A data storage system as in claim 16 wherein the first set of disk drives resides in a first disk array enclosure; wherein the second set of disk drives resides in a second disk array enclosure; and wherein the controller, when providing operating power to the first set of storage devices and not providing operating power to the second set of storage devices, is arranged to:

maintain the first disk array enclosure in a powered on state, and maintaining the second disk array enclosure in a powered off state.

18. A data storage system as in claim 16 wherein the controller, when monitoring the amount of storage capacity currently used in the data storage system in view of the predefined storage capacity threshold, is arranged to:

update the amount of storage capacity currently used in the data storage system, and compare the amount of storage capacity currently used in the data storage system to the predefined storage capacity threshold to determine whether the predefined storage capacity threshold has been reached.

19. A data storage system as in claim 18 wherein the controller, when automatically activating the second set of storage devices of the data storage system in response to the amount of storage capacity currently used in the data storage system reaching the predefined storage capacity threshold, is arranged to:

turn on a power supply to deliver operating power to (i) the second set of storage devices and (ii) a cooling subsystem arranged to cool the second set of storage devices.

20. A data storage system as in claim 15, further comprising:

a power supply which includes a switch configured to turn on delivery of operating power to the second set of storage devices and a cooling subsystem arranged to cool the second set of storage devices upon receiving from the controller a control signal having a value indicating whether the second set of storage devices and the cooling subsystem are to be activated.

* * * * *